(12) United States Patent
Yanase

(10) Patent No.: US 6,839,615 B2
(45) Date of Patent: Jan. 4, 2005

(54) METHOD AND APPARATUS FOR ESTIMATING MASS OF VEHICLE, AND METHOD AND APPARATUS FOR ESTIMATING GRADIENT EMPLOYING THE METHOD

(75) Inventor: Minao Yanase, Kobe (JP)

(73) Assignee: Sumitomo Rubber Industries, Ltd., Hyogo-ken (JP)

(*) Notice: Subject to any disclaimer, the term of this patent is extended or adjusted under 35 U.S.C. 154(b) by 0 days.

(21) Appl. No.: 10/609,619

(22) Filed: Jul. 1, 2003

(65) Prior Publication Data
US 2004/0006421 A1 Jan. 8, 2004

(30) Foreign Application Priority Data
Jul. 3, 2002 (JP) .................................. 2002-194752

(51) Int. Cl.[7] .................................................. G06F 7/00
(52) U.S. Cl. ........................... 701/1; 701/70; 701/90; 702/173
(58) Field of Search ................... 180/233, 248, 180/250; 701/1, 54, 56, 84, 103, 104, 70, 90; 477/102; 303/112; 702/173, 175

(56) References Cited

U.S. PATENT DOCUMENTS

| | | |
|---|---|---|
| 6,249,735 B1 | 6/2001 | Yamada et al. |
| 6,293,632 B1 * | 9/2001 | Grote et al. ................. 303/112 |
| 6,298,300 B1 * | 10/2001 | Ohyama et al. ............ 701/103 |
| 6,339,739 B1 * | 1/2002 | Folke et al. .................. 701/70 |
| 6,339,749 B1 | 1/2002 | Rieker et al. |
| 6,450,588 B2 * | 9/2002 | Grote et al. ................. 303/112 |

FOREIGN PATENT DOCUMENTS

| | | |
|---|---|---|
| EP | 0 142 633 A1 | 5/1985 |
| JP | 9-242862 A | 9/1977 |
| JP | 2003-4128 A | 1/2003 |

* cited by examiner

*Primary Examiner*—Richard M. Camby
(74) *Attorney, Agent, or Firm*—Birch, Stewart, Kolasch & Birch, LLP

(57) ABSTRACT

A method for estimating a mass of a vehicle including the steps of: correcting a wheel torque of a vehicle during running by using a preliminarily obtained wheel torque necessary for running on a flat surface at constant speed, obtaining a regression line of the corrected wheel torque and an acceleration/deceleration of the vehicle, and estimating a mass of the vehicle on the basis of a slope of the regression line. It is possible to estimate the mass of the vehicle at high accuracy.

8 Claims, 8 Drawing Sheets

METHOD AND APPARATUS FOR ESTIMATING MASS OF VEHICLE, AND METHOD AND APPARATUS FOR ESTIMATING GRADIENT EMPLOYING THE METHOD

BACKGROUND OF THE INVENTION

The present invention relates to a method and an apparatus for estimating a mass of a vehicle as well as to a method and an apparatus for estimating a gradient employing the method.

In apparatuses for alarming air-pressure of indirect type which are based on relative comparison of wheel speeds or the like, it is known that physical quantities (such as dynamic load radii) which indirectly represent air-pressure are largely affected by ways of driving, road conditions such as gradients or road surface friction coefficients $\mu$, or load conditions of the vehicle. For eliminating such influences, it has been conventionally performed that data containing therein a large number of errors are identified from among wheel speeds or pieces of information of sensors provided in the vehicle, and that corresponding pieces of data are corrected or eliminated.

However, as for uphill/downhill driving and changes in weight owing to the number of passengers or the amount of luggage or to the presence/absence of a traction vehicle, such data cannot be identified and accordingly corrected or eliminated although such factors largely affect the above-described indirect physical quantities such as dynamic load radii.

For instance, Japanese Unexamined Patent Publication No. 242862/1997 describes an apparatus A for estimating road surface gradients. This publication utilizes the fact that the relationship of vehicle driving torque=flat surface running resistance torque+acceleration resistance torque+gradient resistance torque is satisfied since the vehicle driving torque balances with the sum of the flat surface running resistance torque, the acceleration resistance torque and the gradient resistance torque. The gradient resistance torque is then calculated upon obtaining the vehicle driving torque, the flat surface running resistance torque and the acceleration resistance torque so as to obtain a road surface gradient sin θ from the following equation.

$$T\theta = W \times g \times \sin\theta \times Rt$$

Here,

Tθ: Gradient resistance torque
W: Vehicle weight
g: Gravitational acceleration
Rt: Load radius of tire.

In the above apparatus A, the flat surface running torque and the acceleration resistance torque are calculated by using preliminarily obtained data for calculating a gradient resistance torque upon performing deductions so as to calculate a gradient. However, since both of the flat surface running torque and the acceleration resistance torque are amounts which are dependent on a mass of a vehicle or an air resistance coefficient thereof, it is possible that errors become larger when the vehicle is towing a trailer, when many pieces of luggage or passengers are riding thereon or when a roof carrier is mounted onto the roof of the vehicle.

In contrast thereto, it is possible to employ, instead of driving torque, slip rates which can be obtained from wheel speeds of the front and rear wheels and to detect gradients by using data in which the vehicle acceleration is proximate to zero for the purpose of eliminating influences of acceleration resistance torque.

When employing this idea, gradients are detected upon performing regression and obtaining slip rates when the acceleration is zero for the purpose of eliminating influences of acceleration resistance torque; however, it is impossible to detect gradients at high accuracy since it is difficult to take influences of wear of tires through running, of changes in the entire weight caused through luggage or the number of passengers, and of changes in front and rear distribution of load into consideration.

SUMMARY OF THE INVENTION

The present invention has been made in view of the above facts, and it is an object thereof to provide a method and an apparatus for estimating a mass of a vehicle at high accuracy as well as to a method and an apparatus for estimating gradients employing the above method at high accuracy.

In accordance with a first aspect of the present invention, there is provided a method for estimating a mass of a vehicle including the steps of: correcting a wheel torque of a vehicle during running by using a preliminarily obtained wheel torque necessary for running on a flat surface at constant speed, obtaining a regression line of the corrected wheel torque and an acceleration/deceleration of the vehicle, and estimating a mass of the vehicle on the basis of a slope of the regression line.

In accordance with a second aspect of the present invention, there is provided an apparatus for estimating a mass of a vehicle including: wheel speed detecting means for detecting wheel speed revolution information of tires of the vehicle, a first correction means for correcting a wheel torque of a vehicle during running by using a preliminarily obtained wheel torque necessary for running on a flat surface at constant speed, a regression calculation means for obtaining a regression line of the corrected wheel torque and an acceleration/deceleration of the vehicle, and a mass estimation means for estimating a mass of the vehicle on the basis of a slope of the regression line.

Further, in accordance with a third aspect of the present invention, there is provided a method for estimating a gradient including the steps of: correcting a wheel torque of a vehicle during running by using a preliminarily obtained wheel torque necessary for running on a flat surface at constant speed, obtaining a regression line of the corrected wheel torque and an acceleration/deceleration of the vehicle, and estimating a gradient of a road surface from an intercept of the regression line on the basis of a mass of the vehicle which is obtained on the basis of a slope of the regression line.

Moreover, in accordance with a fourth aspect of the present invention, there is provided an apparatus for estimating a gradient including: wheel speed detecting means for detecting wheel speed revolution information of tires of the vehicle, a first correction means for correcting a wheel torque of a vehicle during running by using a preliminarily obtained wheel torque necessary for running on a flat surface at constant speed, a regression calculation means for obtaining a regression line of the corrected wheel torque and an acceleration/deceleration of the vehicle, and a gradient estimation means for estimating a gradient of a road surface from an intercept of the regression line on the basis of a mass of the vehicle which is obtained on the basis of a slope of the regression line.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

The present invention will become more fully understood from the detailed description given hereinbelow and the accompanying drawings which are given by way of illustration only, and thus are not limitative of the present invention, and wherein:

DETAILED DESCRIPTION

The method and the apparatus for estimating a mass of a vehicle as well as the method and the apparatus for estimating a gradient employing the above method will now be explained on the basis of the accompanying drawings.

Figure 1:
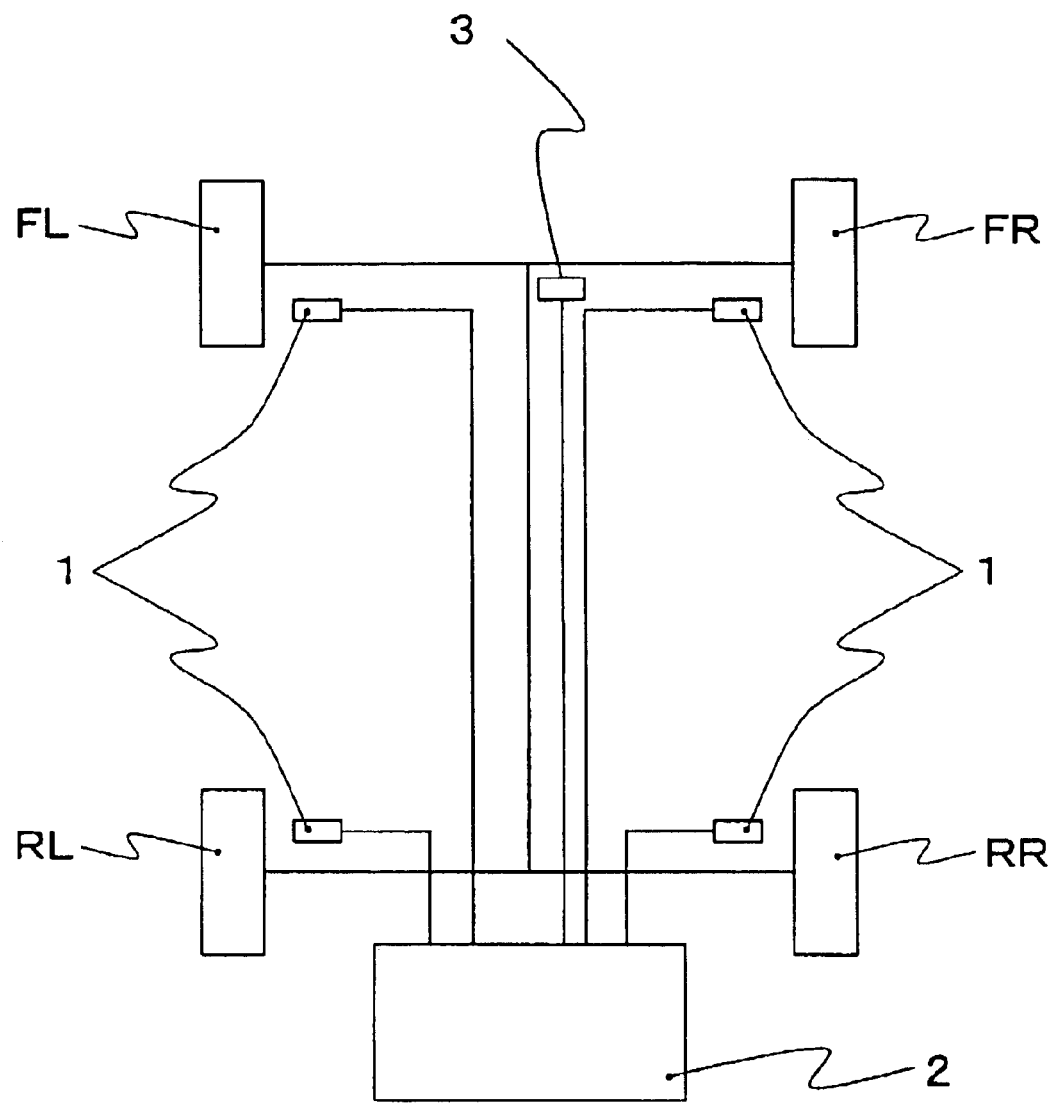
FIG. 1 is a block view illustrating an embodiment of the apparatus for detecting decrease in tire air-pressure according to the present invention.

As illustrated in FIG. 1, the apparatus for estimating a mass according to one embodiment of the present invention is for estimating a gradient of a road surface on the basis of wheel speed revolution information of four tires FL, FR, RL and RR (hereinafter generally referred to as Wi, wherein i=1 to 4, 1: front left tire, 2: front right tire, 3: rear left tire, 4: rear right tire) of a four-wheeled vehicle during running, and is composed with ordinary wheel speed detecting means 1 which are provided in relation to the respective tires Wi. The vehicle is further equipped with a front and rear directional acceleration sensor (hereinafter simply referred to as "acceleration sensor") 3 which is so provided as to face a progressing direction of the vehicle.

The wheel speed detecting means 1 might be a wheel speed sensor for measuring a wheel speed on the basis of number of pulses upon generating rotational pulses by using an electromagnetic pickup or similar, or an angular velocity sensor in which power is generated through rotation such as in a dynamo, wherein the rotational information is measured from a voltage thereof. Outputs of the wheel speed detecting means 1 are supplied to a control unit 2 which might be a computer such as an ABS. The acceleration sensor 3 is connected to this control unit 2.

Figure 2:
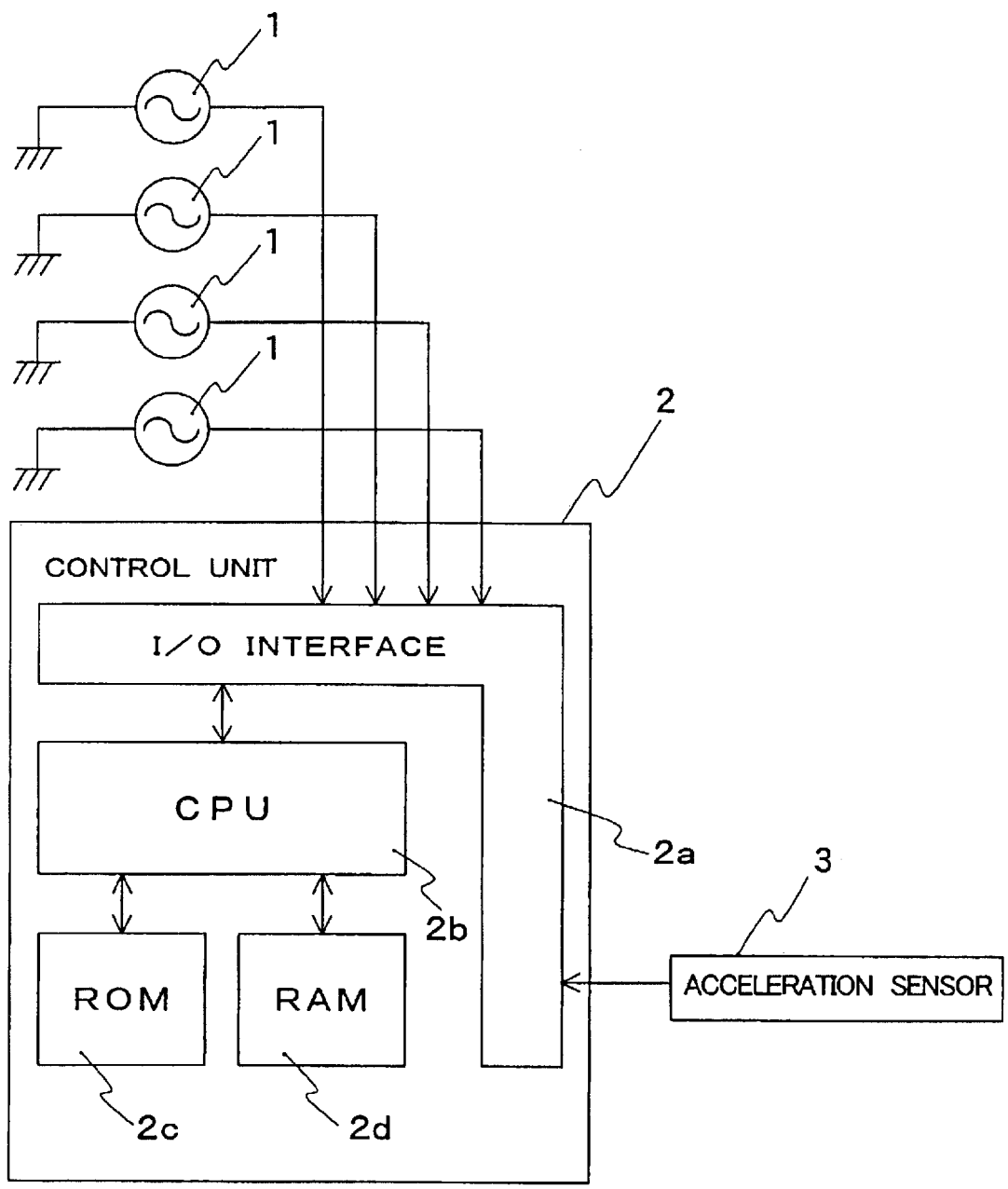
FIG. 2 is a block view illustrating electric arrangements of the apparatus for detecting decrease in tire air-pressure of FIG. 1.

As illustrated in FIG. 2, the control unit 2 comprises an I/O interface 2a required for sending/receiving signals to/from an external device, a CPU 2b which functions as a center of calculation, a ROM 2c which stores a control operation program for the CPU 2b, and a RAM 2d into which data are temporally written and are read out therefrom when the CPU 2b performs control operations.

Pulse signals corresponding to the rotational number of tires Wi (hereinafter referred to as "wheel speed pulse") are output from the wheel speed detecting means 1. In the CPU 2b, rotational angular velocities Fi for the respective tires Wi are calculated on the basis of the wheel speed pulses as output from the wheel speed detecting means 1 at specified sampling periods ΔT (sec), for instance, ΔT=1 sec.

Since the tires Wi are manufactured to include variations (initial differences) within standards, effective rolling radii r of the respective tires Wi (a value obtained by dividing a distance which has been traveled by a single rotation by 2 π) are not necessarily identical even though all of the tires Wi have normal internal pressure. This will result in variations in the rotational angular velocities $F_i$ of the respective tires Wi. Thus, corrected rotational angular velocities $F1_i$ are calculated to cancel variations owing to initial differences. More particularly, corrections are performed to satisfy $F1_1 = F_1$ $F1_2 = mF_2$ $F1_3 = F_3$ $F1_4 = nF_4.$ The correction coefficients m and n are obtained as $m = F_1/F_2$ and $n = F_3/F_4$ on the basis of rotational angular velocities $F_i$ when the rotational angular velocities $F_i$ have been calculated on the premise that the vehicle is performing straight-ahead driving. Then, wheel speeds Vi of the respective tires are calculated on the basis of $F1_i$.

In the present invention, not less than three pieces of data on the wheel torque (running resistance) of the running vehicle and acceleration/deceleration are collected within a specified period of time, wherein these data are corrected by the wheel torque when performing running on a flat surface at constant speed, and points of measurement are regressed by a straight line. It is known that a slope of this regression line represents a mass of the vehicle while an intercept thereof represents a gradient of the road surface. The present embodiment is accordingly so arranged that the wheel torque of the vehicle during running is corrected by a preliminarily obtained wheel torque necessary for running on a flat surface road at constant speed whereupon a regression line of the corrected wheel torque and the acceleration/deceleration of the vehicle is obtained for estimating a mass of the vehicle from the slope of the regression line. The present embodiment thus includes wheel speed detecting means 1, a first correction means for correcting a wheel torque of a vehicle during running by using a preliminarily obtained wheel torque necessary for running on a flat surface at constant speed, a regression calculation means for obtaining a regression line of the corrected wheel torque and an acceleration/deceleration of the vehicle, and a mass estimation means for estimating a mass of the vehicle on the basis of a slope of the regression line. It is preferable that it further comprises a second correction means for performing correction of the wheel torque of the vehicle during running on a the basis of a relationship between the wheel torque necessary for running on a flat surface road at constant speed and the vehicle body speed of the vehicle.

The wheel torque of the vehicle during running might be obtained through calculation on the basis of engine torque, engine revolution speed or acceleration throttling degrees.

The wheel torque necessary for running on a flat surface road at constant speed can be obtained by collecting data during actual running when the acceleration/deceleration is proximate to zero.

While the acceleration/deceleration of the vehicle might also be obtained on the basis of detection signals by using the acceleration sensor 3, they might also be obtained from the following equation (1) provided that wheel speed data preceding the average wheel speed $Vf_n$ of the following wheels by one is defined to be average wheel speed $Vf_{n-1}$.

$$Af_n = (Vf_n - Vf_{n-1})/\Delta t \quad (1)$$

Here, $\Delta t$ denotes a time interval (sampling time) between wheel speed $Vf_n$ and $Vf_{n-1}$ as calculated from the wheel speed data. The sampling time is not more than 1 (one) second.

Since acceleration a is generated in a vehicle when the vehicle of mass m is made to move on a flat surface road upon applying driving force F from a condition in which it performs running at constant speed, the relationship between these three elements can be represented as the following equation (2).

$$F = m \times a \quad (2)$$

At this time, the driving force F can be obtained by dividing a torque (T−Ts) obtained by subtracting a wheel torque Ts when running on a flat surface road at constant speed from the wheel torque T which is acting at this point of time by a load radius Rt of the wheels. Data on the driving force F and acceleration a undergo linear regression with the longitudinal axis representing driving force F and the horizontal axis acceleration a. The mass m of the vehicle is represented by the slope of the regression line.

Since m·g·sin θ is applied to the driving force when the vehicle is made to run on a road surface with an inclination angle of θ, $$F = m \times a + m \cdot g \cdot \sin \theta \quad (3)$$

is given. This straight line will correspond to the above straight line (the straight line representing F=m×a) moved towards the Y axis in a parallel manner, and the intercept is given by m·g·sin θ. Since the mass m is given by the slope of the regression line, it is possible to calculate the inclination angle θ of the road surface on the basis of values of the mass and the intercept. Accordingly, by observing slopes of the regression line, it is possible to obtain a mass (weight) of the vehicle and to obtain the inclination of the road surface by observing the intercepts.

According to another embodiment of the present invention, it is possible to arrange an apparatus for estimating a gradient provided with a gradient estimation means for estimating a gradient of a road surface from an intercept of the regression line on the basis of a mass of the vehicle which is obtained on the basis of a slope of the regression line. The second correction means might perform correction of wheel torque of the running vehicle on the basis of a relationship between the wheel torque necessary for running on a flat surface road at constant speed and the vehicle body speed of the vehicle. More particularly, upon preliminarily making the vehicle run on a flat surface road at various constant speeds, wheel torques of respective constant speeds are measured and stored. Then, correction is performed in which a torque obtained by subtracting a wheel torque necessary for running on a flat surface road at constant speed from the wheel torque of the currently running vehicle is divided by a load radius Rt of the wheels.

While the present invention will now be explained on an example thereof, the present invention is not to be limited to such an example only.

EXAMPLE

Figure 3:
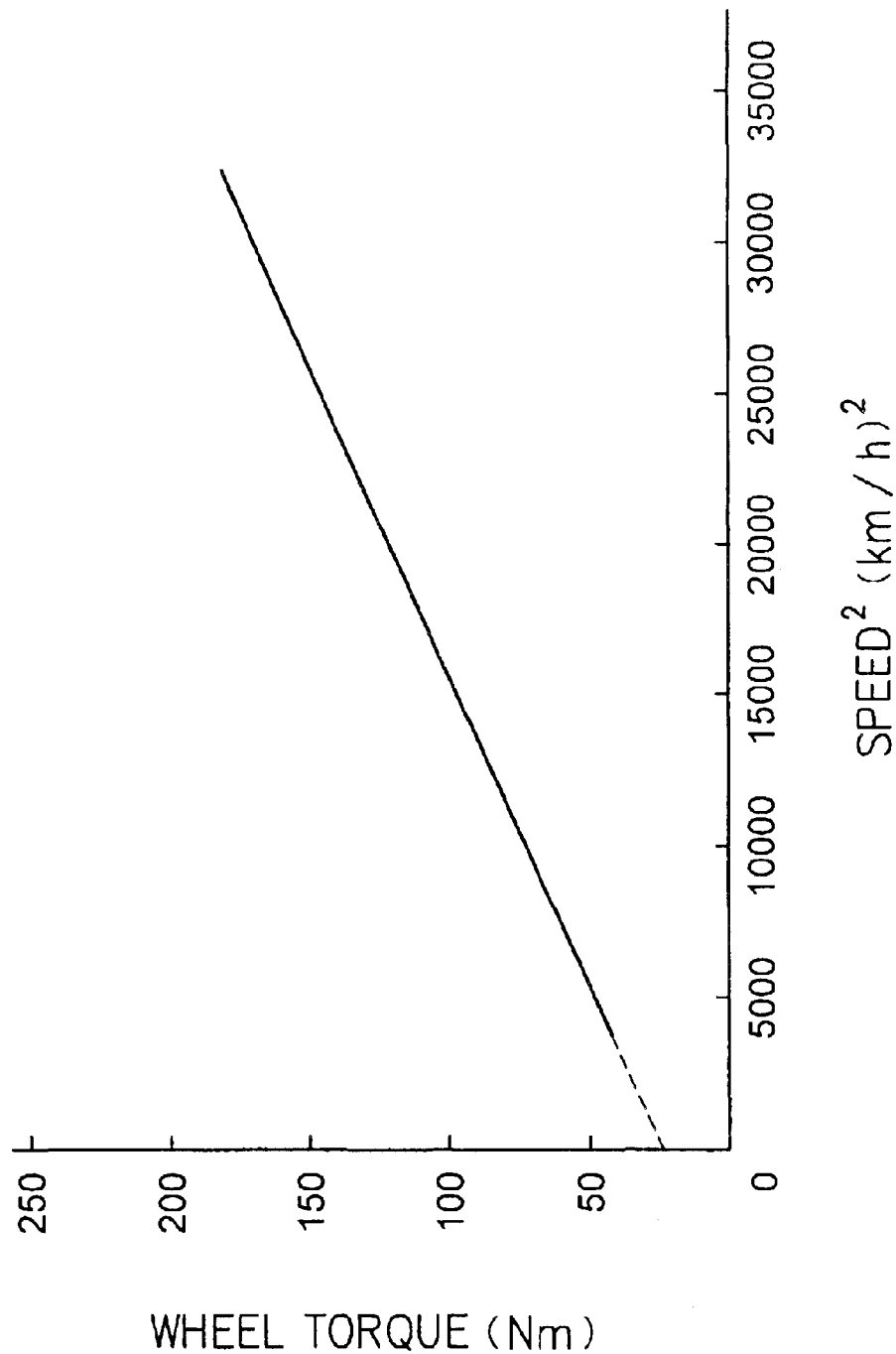
FIG. 3 is a view illustrating a regression line of constant-speed running wheel torque.

A front-wheel drive vehicle was prepared as the vehicle. The tire size was 205/55R16. Wheel torques necessary for running on flat surface roads at constant speed were first obtained for each of the wheels upon changing speeds. Linear regressions of average wheel torques of four wheels are illustrated in FIG. 3.

The vehicle was first made to run from point A to point B of a mountain path without a trailer being attached thereto for measuring the wheel torque during running and acceleration/deceleration (front and rear acceleration) of the vehicle, ten pieces of data corrected by the wheel torque during running at constant speed corresponding to the vehicle body speed during running were collected and linear regression was undergone. Data on slopes and data on intercepts of such linear regressions are respectively illustrated in FIGS. 4 and 5 as judged values. It should be noted that linear regression is performed at a point of time at which ten pieces of data have been accumulated, and when the eleventh piece of data is sampled, the first one is abandoned and linear regression is again performed with ten pieces of data including the newest one. It should be noted that slopes of linear regression represent amounts proportional to the mass of the vehicle while intercepts represent amounts proportional to the gradient of the road surface.

Figure 6:
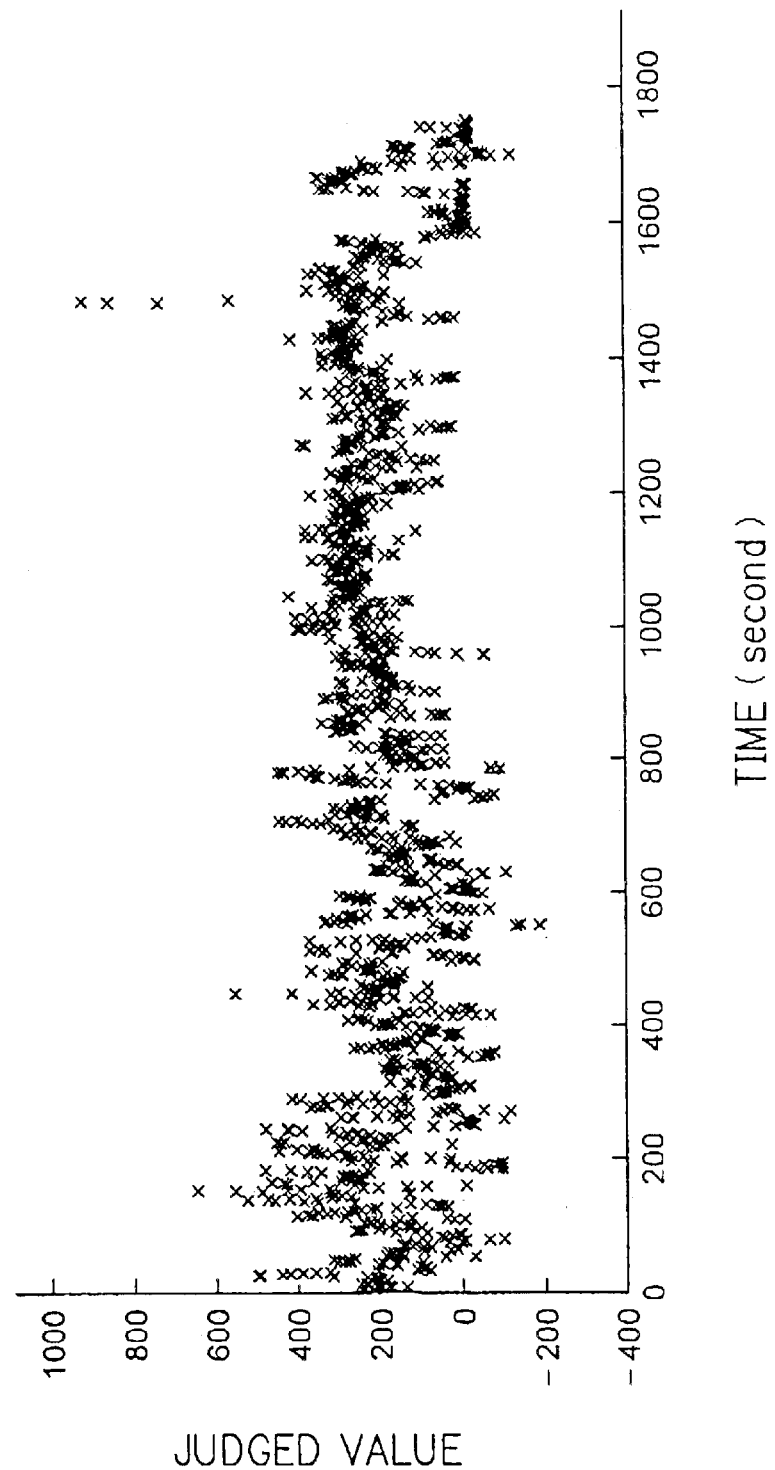
FIG. 6 is a view illustrating slopes of regression lines when a vehicle is made to run on the same mountain road with a trailer being attached thereto.
Figure 7:
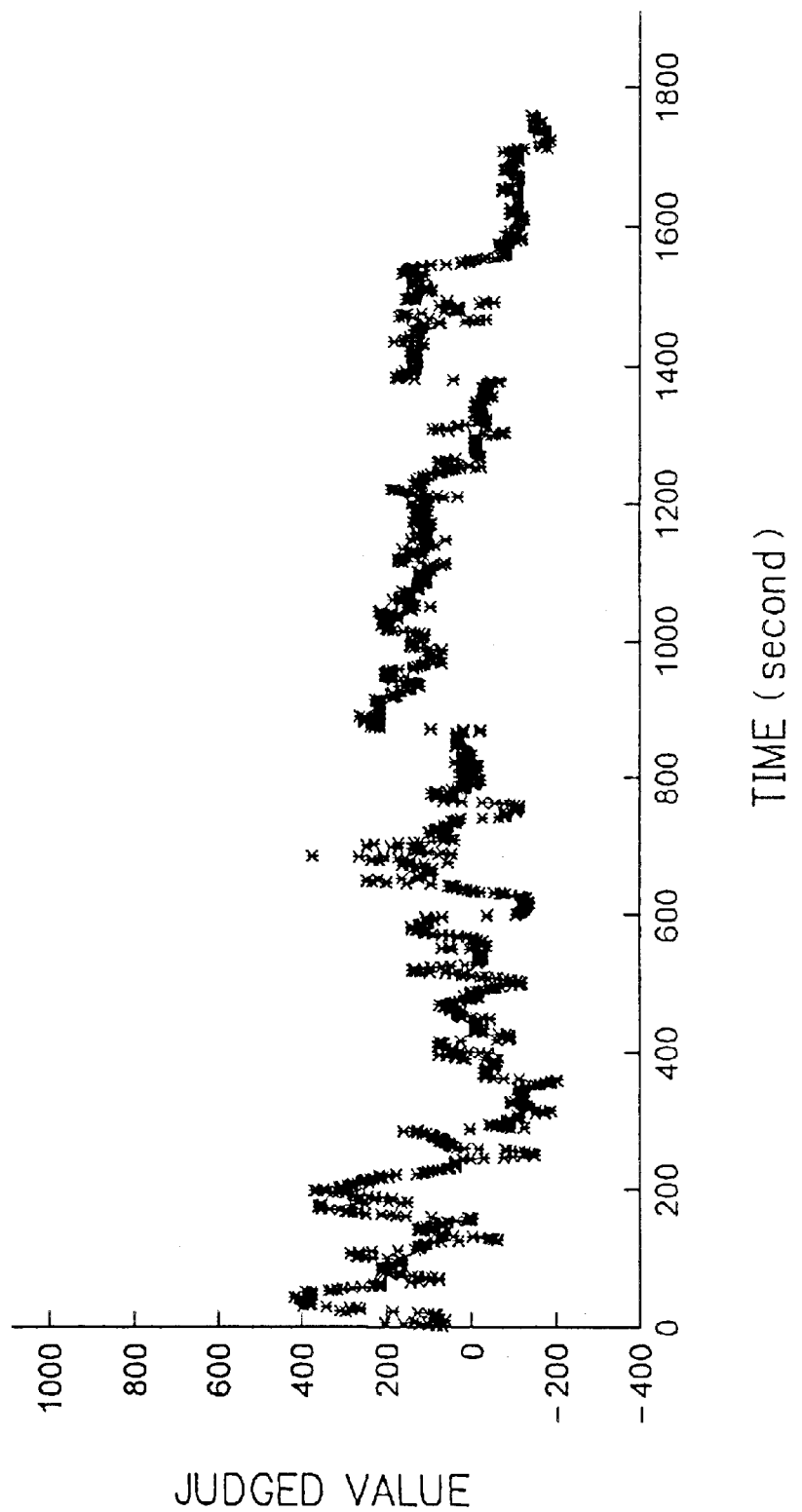
FIG. 7 is a view illustrating intercepts of regression lines when a vehicle is made to run on the same mountain road with a trailer being attached thereto.

Data on slopes and data on intercepts of linear regressions when a trailer was attached to the vehicle, and the vehicle was made to run the same mountain road from point A towards point B are illustrated in FIGS. 6 and 7 as judged values, respectively.

Figure 5:
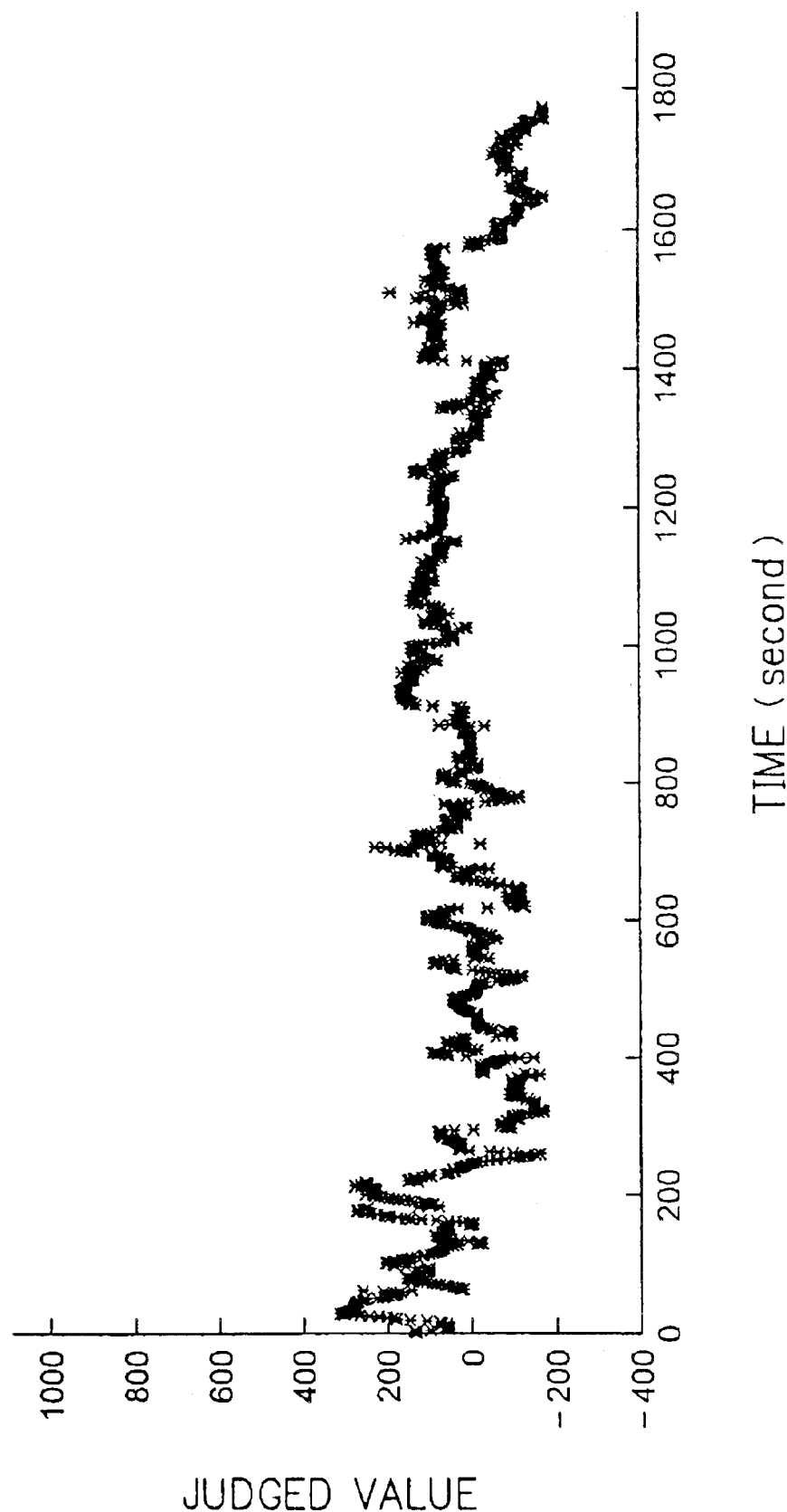
FIG. 5 is a view illustrating intercepts of regression lines when a vehicle is made to run on a mountain road without a trailer being attached thereto.
Figure 8:
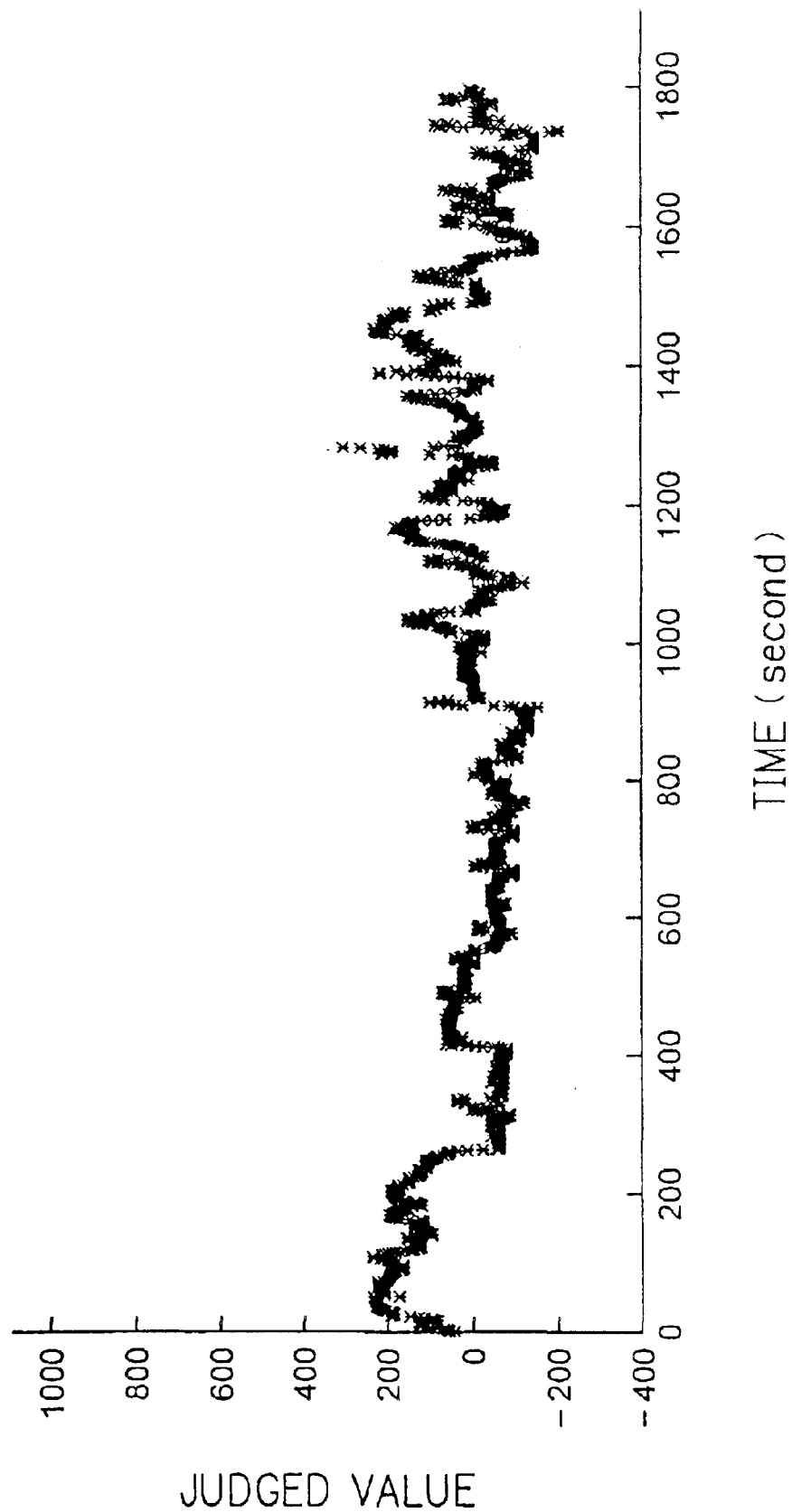
FIG. 8 is a view illustrating intercepts of regression lines when a vehicle is made to run on the mountain road in a reverse direction without a trailer being attached thereto.

Note that when the vehicle is made to run the same mountain road in a reverse direction (from point B to point A) without a trailer being attached thereto, uphill running on the going will be the downhill running on the returning and the starting point on the going will be the end point on the returning, and it can be seen upon comparing FIG. 5 which has been rotated (reversed) by 180 degrees as illustrated in FIG. 8 that both are substantially identical to each other.

It can also be understood from FIG. 6 that the slope of linear regression representing the mass of the vehicle has apparently increased. It can also be understood from changes in intercepts in FIG. 7 that the amplitude has apparently become larger when compared to FIG. 5. This is due to the fact that the mass of the vehicle has increased.

Figure 4:
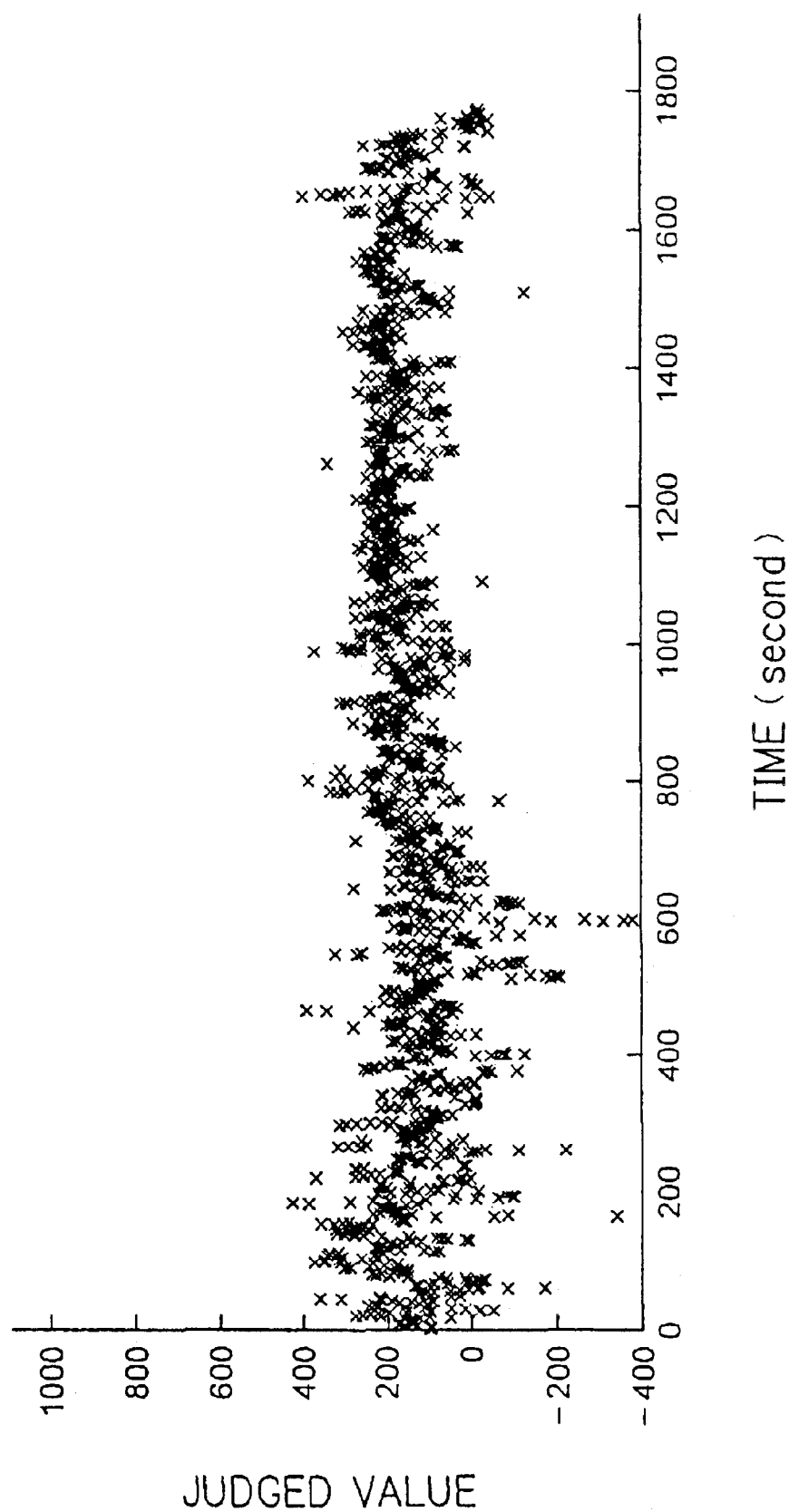
FIG. 4 is a view illustrating slopes and intercepts of regression lines when a vehicle is made to run on a mountain road without a trailer being attached thereto.

Next, exemplary steps for obtaining the mass when no trailer is attached to the vehicle will be explained on the basis of FIG. 4. While the slope (corresponding to the mass of the vehicle) shall represent m of the above equation (1) F=m×a, since the driving force F cannot be directly measured, this value is substituted by wheel torque/tire load radius (WT/Rt) as in the following equation (4)

$$WT = m \times Rt \times a \quad (4)$$

Since the slope represents m×Rt of this equation, it is divided by the tire load radius (approximately 0.3 m) for obtaining the mass m. This value needs to be doubled since it corresponds to only a tire of one wheel. When data from among data of FIG. 4 which is considered to be of high correlation are averaged, since the average value of the wheel torque is 186 (kg·m), the mass m of the vehicle without the trailer can be finally obtained as follows.

$$m=186/0.3\times2=1240 (kg)$$

On the other hand, while the intercept represents m·g·sin θ from among $$F-m\cdot g\cdot\sin\theta=m\times a$$

from the above equation (3) when considering uphill running, since wheel torque WT is used instead of the driving force F, the intercept might be represented as m·g·sin θ·Rt.

Next, since sin θ can be obtained by dividing the intercept by already obtained values for the mass m=1240 kg, g=9.8 and the tire load radius Rt=0.3 m, it is possible to obtain the road surface gradient. For instance, when the value of the intercept judged value) is 200 in FIG. 5, the value of sin θ will be as follows.

$$200/1240/9.8/0.3=0.05486$$

Here, when the value of θ is small, sin θ will be substantially identical to θ (rad) so that the gradient will be $$\sin\theta=0.05486=\theta(\text{rad})=3.14 \text{ (degrees)}.$$

As explained so far, it is possible to estimate the mass of the vehicle at high accuracy when employing the present invention.

It is further possible to estimate a gradient of a road surface at high accuracy when employing the present invention.

Accordingly, in the present invention, gradients of road surfaces are estimated at high accuracy during running so that when such gradients are used for transmission control information of automatic transmissions, apparatuses for detecting decrease in tire air-pressure (DWS) or apparatuses for judging road surface conditions, it is possible to improve the driving performance and safety of running.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A method for estimating a mass of a vehicle comprising the steps of:

obtaining a value of a corrected wheel torque of a vehicle during running by using a preliminarily obtained wheel torque necessary for running on a flat surface at constant speed, obtaining a regression line of the corrected wheel torque and an acceleration/deceleration of the vehicle, and estimating a mass of the vehicle on the basis of a slope of the regression line.

2. The method of claim 1, wherein the method further comprises the step of obtaining a value of a corrected wheel torque of the vehicle during running on the basis of a relationship between the wheel torque necessary for running on a flat surface road at constant speed and a vehicle body speed of the vehicle.

3. An apparatus for estimating a mass of a vehicle comprising: wheel speed detecting means for detecting wheel speed revolution information of tires of the vehicle, a first correction means for correcting a wheel torque to obtain a corrected wheel torque of a vehicle during running by using a preliminarily obtained wheel torque necessary for running on a flat surface at constant speed, a regression calculation means for obtaining a regression line of the corrected wheel torque and an acceleration/deceleration of the vehicle, and a mass estimation means for estimating a mass of the vehicle on the basis of a slope of the regression line.

4. The apparatus of claim 3, wherein the apparatus further comprises a second correction means for performing correction of a wheel torque to obtain a corrected wheel torque of the vehicle during running on the basis of a relationship between the wheel torque necessary for running on a flat surface road at constant speed and a vehicle body speed of the vehicle.

5. A method for estimating a gradient comprising the steps of:

obtaining a value of a corrected wheel torque of a vehicle during running by using a preliminarily obtained wheel torque necessary for running on a flat surface at constant speed, obtaining a regression line of the corrected wheel torque and an acceleration/deceleration of the vehicle, and estimating a gradient of a road surface from an intercept of the regression line on the basis of a mass of the vehicle which is obtained on the basis of a slope of the regression line.

6. The method of claim 5, wherein the method further comprises the step of obtaining a value of a corrected wheel torque of the vehicle during running on the basis of a relationship between the wheel torque necessary for running on a flat surface road at constant speed and a vehicle body speed of the vehicle.

7. An apparatus for estimating a gradient comprising:

wheel speed detecting means for detecting wheel speed revolution information of tires of the vehicle, a first correction means for correcting a wheel torque to obtain a corrected wheel torque of a vehicle during running by using a preliminarily obtained wheel torque necessary for running on a flat surface at constant speed, a regression calculation means for obtaining a regression line of the corrected wheel torque and an acceleration/deceleration of the vehicle, and a gradient estimation means for estimating a gradient of a road surface from an intercept of the regression line on the basis of a mass of the vehicle which is obtained on the basis of a slope of the regression line.

8. The apparatus of claim 7, wherein the apparatus further comprises a second correction means for performing correction of a wheel torque to obtain a corrected wheel torque of the vehicle during running on the basis of a relationship between the wheel torque necessary for running on a flat surface road at constant speed and a vehicle body speed of the vehicle.

* * * * *